US011876331B2

(12) United States Patent
Huang et al.

(10) Patent No.: US 11,876,331 B2
(45) Date of Patent: Jan. 16, 2024

(54) WIRE-CLAMPING CONNECTOR

(71) Applicant: CviLux Corporation, New Taipei (TW)

(72) Inventors: Wen-Hsin Huang, New Taipei (TW); Chih-Chiang Wang, New Taipei (TW)

(73) Assignee: CviLux Corporation, New Taipei (TW)

(*) Notice: Subject to any disclaimer, the term of this patent is extended or adjusted under 35 U.S.C. 154(b) by 233 days.

(21) Appl. No.: 17/521,809

(22) Filed: Nov. 8, 2021

(65) Prior Publication Data

US 2022/0344841 A1 Oct. 27, 2022

Related U.S. Application Data

(60) Provisional application No. 63/178,517, filed on Apr. 22, 2021.

(51) Int. Cl.

*H01R 4/48* (2006.01)
*H01R 13/502* (2006.01)
*H01R 9/24* (2006.01)

(52) U.S. Cl.

CPC ....... *H01R 4/48365* (2023.08); *H01R 9/2416* (2013.01); *H01R 13/502* (2013.01)

(58) Field of Classification Search

CPC ............. H01R 4/48365; H01R 9/2416; H01R 13/502; H01R 4/48275

See application file for complete search history.

(56) References Cited

U.S. PATENT DOCUMENTS

| | | | | |
|---|---|---|---|---|
| 6,066,007 A * | 5/2000 | Huang | H01R 13/432 439/748 |
| 6,280,230 B1 | 8/2001 | Takase et al. | |
| 7,513,793 B2 * | 4/2009 | Horst | H01R 4/48185 439/427 |
| 8,882,533 B2 * | 11/2014 | Brandberg | H01R 12/515 439/441 |

(Continued)

FOREIGN PATENT DOCUMENTS

| | | |
|---|---|---|
| CN | 1290976 A | 4/2001 |
| TW | M404509 U1 | 5/2011 |

(Continued)

*Primary Examiner* — Abdullah A Riyami
*Assistant Examiner* — Nader J Alhawamdeh
(74) *Attorney, Agent, or Firm* — Li & Cai Intellectual Property Office

(57) ABSTRACT

A wire-clamping connector is provided. The wire-clamping connector includes a housing and a contact element. The housing includes a through hole. The contact element is disposed in the housing, and includes a bottom plate structure and an elastic sheet body. The bottom plate structure is disposed opposite to a top wall of the housing, and includes a protruding portion that has a contact surface. A terminal portion of the elastic sheet body is fixed to the top wall, and the elastic sheet body has an acute-angular structure configured to be adjacent to the contact surface. An insertion interval is defined between the acute-angular structure and the contact surface. A wire core of a wire inserted in the through hole enters the insertion interval and is clamped together by the acute-angular structure and the contact surface, and an elastic restoring force is generated by the pressed elastic sheet body.

9 Claims, 15 Drawing Sheets

(56) References Cited

U.S. PATENT DOCUMENTS

| | | | | |
|---|---|---|---|---|
| 8,968,022 | B2 * | 3/2015 | Mostoller | H01R 4/48365 439/438 |
| 9,543,682 | B2 * | 1/2017 | Jin | H01R 4/48365 |
| 9,735,479 | B2 * | 8/2017 | Chen | H01R 4/48185 |
| 9,799,968 | B2 * | 10/2017 | Lin | H01R 4/70 |
| 10,193,244 | B2 | 1/2019 | Aboulkassem et al. | |
| 10,476,181 | B2 * | 11/2019 | Kaneko | H01R 4/48275 |
| 10,763,602 | B2 * | 9/2020 | Favero | H01R 9/24 |
| 2011/0250775 | A1 * | 10/2011 | Bies | H01R 4/48365 439/296 |
| 2011/0250803 | A1 * | 10/2011 | Bies | B60N 2/015 439/752.5 |
| 2016/0049745 | A1 * | 2/2016 | Jin | H01R 12/515 439/733.1 |
| 2022/0344841 | A1 * | 10/2022 | Huang | H01R 13/502 |

FOREIGN PATENT DOCUMENTS

| | | | | |
|---|---|---|---|---|
| TW | M406277 | U1 | | 6/2011 |
| TW | M523983 | U | | 6/2016 |
| TW | M569952 | U | * | 11/2018 |

* cited by examiner

WIRE-CLAMPING CONNECTOR

CROSS-REFERENCE TO RELATED PATENT APPLICATION

This application claims priority to the U.S. Provisional Patent Application Ser. No. 63/178,517 filed on Apr. 22, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is “prior art” to the disclosure described herein. All references cited and discussed in this specification are incorporated herein by reference in their entireties and to the same extent as if each reference was individually incorporated by reference.

FIELD OF THE DISCLOSURE

The present disclosure relates to a connector, and more particularly to a wire-clamping connector.

BACKGROUND OF THE DISCLOSURE

Conventional wire-clamping connectors mostly use a contact structure to clamp a wire core of a wire in a point-contact manner. Therefore, the wire can easily be separated from the contact structure by an external force, and due to the point-contact manner between the contact structure and the wire core, an electrical connection between the contact structure and the wire core is less than ideal.

SUMMARY OF THE DISCLOSURE

In response to the above-referenced technical inadequacies, the present disclosure provides a wire-clamping connector, so as to improve on problems such as wires in conventional wire-clamping connectors being easily detached due to external forces, and a wire core of the wire being contacted in a point-contact manner so as to result in a poor electrical connection.

In one aspect, the present disclosure provides a wire-clamping connector that includes a housing and at least one contact element. The housing includes at least one through hole and at least one accommodating slot. The accommodating slot penetrates a top wall of the housing, the through hole penetrates a side wall of the housing, and the through hole and the accommodating slot are communicated with each other. The at least one contact element is disposed in the housing, and includes a bottom plate structure and an elastic sheet body. The bottom plate structure is disposed opposite to the top wall and includes a protruding portion that has a contact surface. A terminal portion of the elastic sheet body is fixed to the top wall, and a portion of the elastic sheet body is formed by the terminal portion extending in a direction toward the protruding portion. The elastic sheet body has an acute-angular structure, the acute-angular structure is configured to be adjacent to the contact surface, and an insertion interval is defined between the acute-angular structure and the contact surface. The through hole is configured for insertion of a wire, a wire core of the wire inserted in the through hole enters the insertion interval and is clamped together by the acute-angular structure and the contact surface, and an elastic restoring force generated by the pressed sheet body allows the wire core to adjoin the contact surface.

Therefore, in the wire-clamping connector provided by the present disclosure, through the elastic sheet body, the acute-angular structure, the contact surface, etc., the elastic sheet body and the bottom plate structure are in contact with the wire core in a surface contact manner. Further, when the wire core is inserted in the insertion interval, the elastic restoring force generated by the pressed elastic sheet body enables the elastic sheet body and the bottom plate structure to provide a relatively better clamping force to clamp the wire core.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
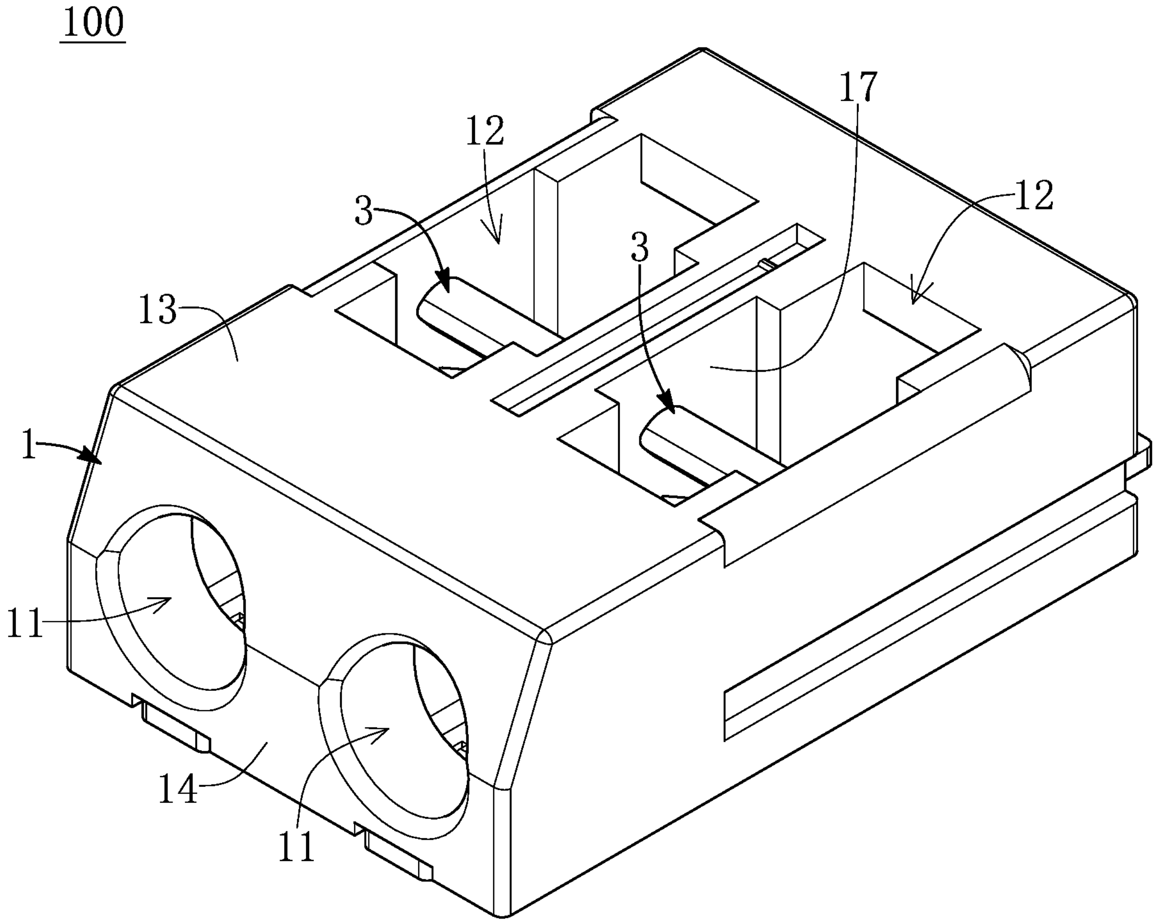
FIG. 1 is a schematic view of a first embodiment of the present disclosure.
Figure 2:
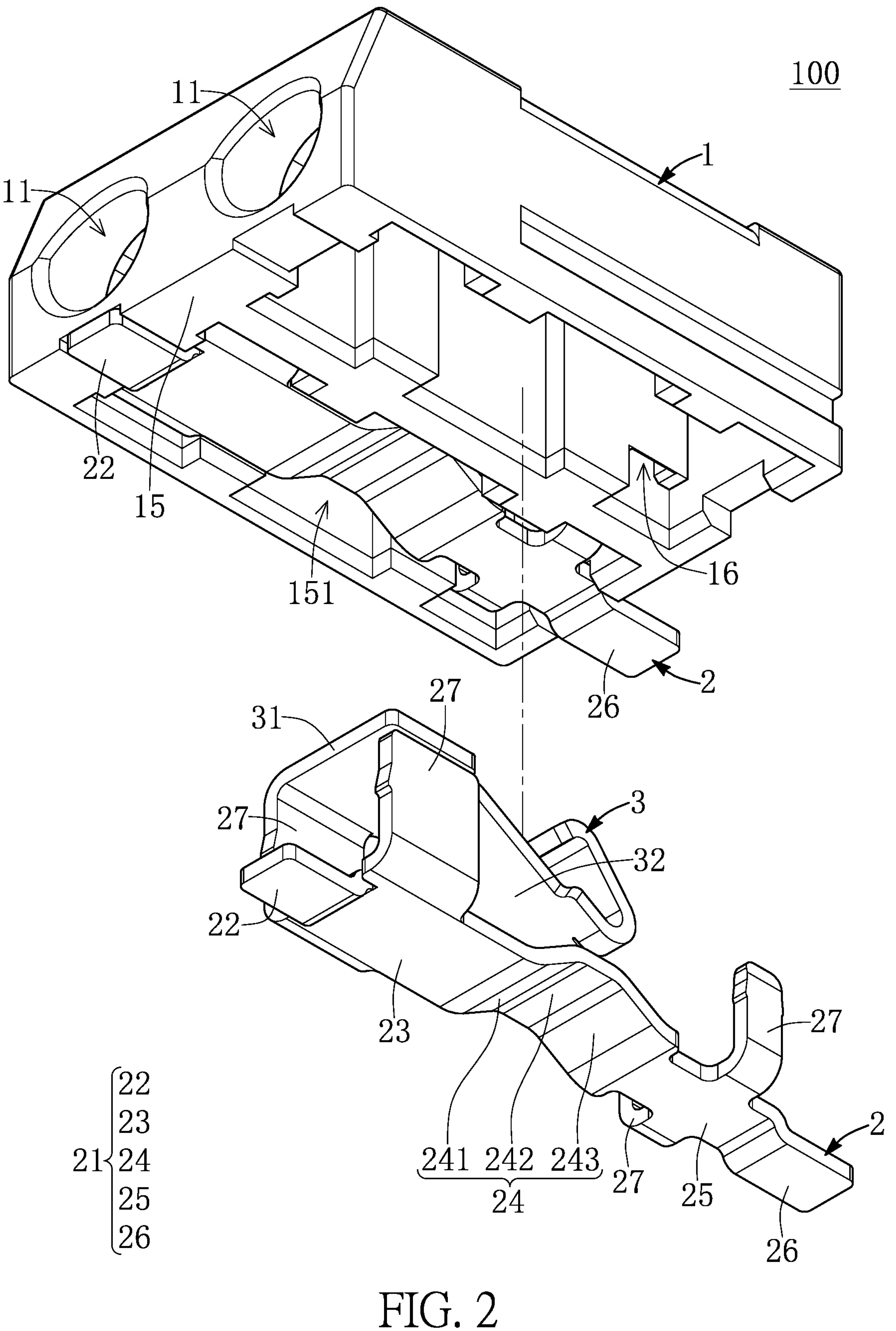
FIG. 2 is a partially exploded view of the present disclosure.
Figure 3:
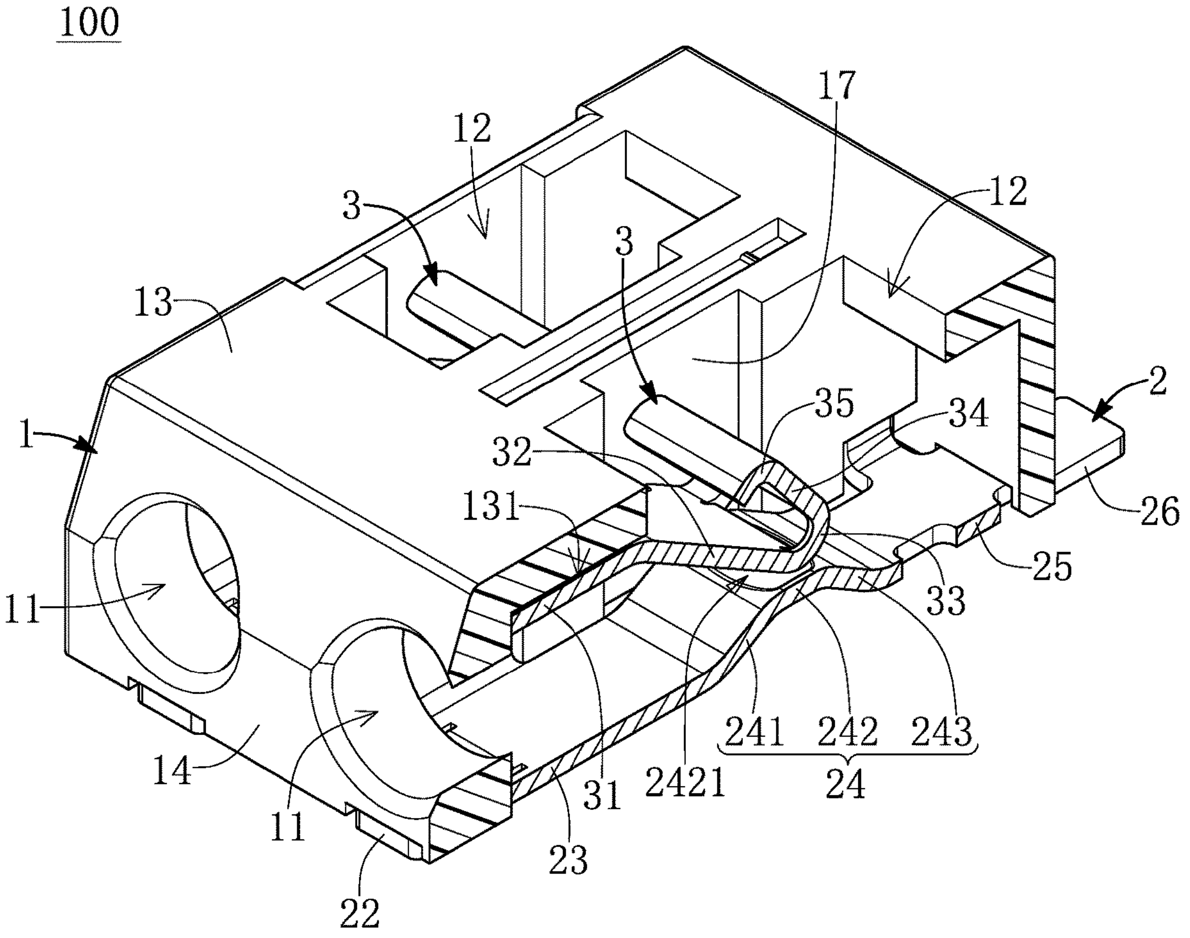
FIG. 3 is a cross-sectional perspective view of the first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

References are made to FIG. 1 to FIG. 7, which are schematic views of a wire-clamping connector according to a first embodiment of the present disclosure. A wire-clamping connector 100 of the present disclosure includes a housing 1 and two contact elements 2 that are disposed in the housing 1. The housing 1 includes two through holes 11 and two accommodating slots 12. The two accommodating slots 12 penetrate a top wall 13 of the housing 1, the two through holes 11 penetrate a side wall 14 of the housing 1, and each of the two through holes 11 and a corresponding one of the two accommodating slots 12 are communicated with each other. Each of the two accommodating slots 12 can penetrate a part of a bottom wall 15 of the housing 1. The two through holes 11 are not communicated with each other, and a blocking wall 17 is located between the two accommodating slots 12.

The two accommodating slots 12 can penetrate the bottom wall 15 of the housing 1, two openings 151 can be correspondingly formed on the bottom wall 15, and the two contact elements 2 can be arranged in the housing 1 through the two openings 151. In practical applications, each of the two contact elements 2 can include four fixing structures 27, and the housing 1 can correspondingly have four engaging slots 16. When each of the two contact elements 2 is disposed in the housing 1, each of the four fixing structures 27 is correspondingly engaged to one of the four engaging slots 16, so that the four fixing structures 27 are each firmly arranged in the housing 1. Each of the two contact elements 2 includes a bottom plate structure 21 and an elastic sheet body 3. The bottom plate structure 21 and the elastic sheet body 3 can be integrally formed. The bottom plate structure 21 can be bent in a direction toward the elastic sheet body 3 to form the four fixing structures 27, two of the four fixing structures 27 are arranged facing each other, and another two of the four fixing structures 27 are arranged facing each other. The bottom plate structure 21 and the elastic sheet body 3 can be connected to each other through one of the four fixing structures 27.

The bottom plate structure 21 can further have a first soldering section 22, a first smooth section 23, a protruding portion 24, a second smooth section 25 and a second soldering section 26. The protruding portion 24 includes a rising section 241, a platform section 242 and a lowering section 243. Two ends of the platform section 242 are respectively connected to one end of the rising section 241 and one end of the lowering section 243. The platform section 242 has a contact surface 2421. Two ends of the first smooth section 23 are respectively connected to the first soldering section 22 and the rising section 241, and two ends of the second smooth section 25 are connected to the lowering section 243 and the second soldering section 26. The first soldering section 22 and the second soldering section 26 are provided for a user to fix the contact element 2 to a circuit board by soldering. The first smooth section 23 and the second smooth section 25 can be arranged substantially parallel to a horizontal plane, and a surface of the first smooth section 23 and a surface of the second smooth section 25 can be substantially flush with each other. The rising section 241 is an inclined sheet structure formed by one end of the first smooth section 23 that is close to the platform section 242 gradually rising in a direction away from the horizontal plane. The platform section 242 can be arranged substantially parallel to the horizontal plane. The descending section 243 is an inclined sheet structure formed by one end of the platform section 242 that is away from the first smooth section 23 gradually descending toward the horizontal plane.

The two fixing structures 27 facing each other can be formed by two opposite sides of the first smooth section 23 extending in a direction substantially perpendicular to the horizontal plane, and one of the two fixing structures 27 facing each other is connected to the elastic sheet body 3. The other two fixing structures 27 facing each other can be formed by two opposite sides of the second smooth section 25 extending in a direction substantially perpendicular to the horizontal plane.

As shown from FIG. 3 to FIG. 6, the elastic sheet body 3 has a fixed section 31, an elastic arm section 32, a bent section 33, a connection section 34, an auxiliary bent section 35 and an acute-angular structure 36. The fixed section 31 is engaged to and arranged in a slot 131 of the top wall 13 (i.e., a terminal portion of the elastic sheet body 3 is fixed to the top wall 13). One end of the fixed section 31 is connected to one end of the elastic arm section 32, and the elastic arm section 32 is formed by the one end of the fixed section 31 gradually approaching and extending in a direction toward the platform section 242 of the bottom plate structure 21 (i.e., a portion of the elastic sheet body 3 is formed by the terminal portion of the elastic sheet body 3 fixed to the top wall 13 in the direction extending toward the protruding portion 24). The bent section 33 is formed by another end of the elastic arm section 32 bending in a direction away from the bottom plate structure 21 and toward an outer surface of the elastic arm section 32, and the bent section 33 is substantially U-shaped. One end of the bent section 33 is connected to one end of the connection section 34, another end of the connection section 34 is connected to the auxiliary bent section 35, and the bent section 33, the connection section 34 and the auxiliary bent section 35 jointly form a substantially U-shaped structure. The connection section 34 can be formed by the one end of the bent section 33 extending in the direction away from the bottom plate structure 21 and toward the outer surface of the elastic arm section 32. The auxiliary bent section 35 can be formed by another end of the connection section 34 bending toward the elastic arm section 32, and a gap S2 is defined between the auxiliary bent section 35 and the outer surface of the elastic arm section 32.

In practical applications, an opening 3A can be formed between the bent section 33 and the elastic arm section 32, and the acute-angular structure 36 can be formed on a terminal of the elastic arm section 32 (that is, the another end of the elastic arm section 32 that is opposite to the one end of the elastic arm section 32 connected to the fixed section 31). The acute-angular structure 36 is configured to be adjacent to the opening 3A, and a part of the acute-angular structure 36 can be correspondingly located in the opening 3A. A tip of the acute-angular structure 36 points toward the contact surface 2421 of the platform section 242, and an insertion interval S1 is defined between the acute-angular structure 36 and the contact surface 2421. Specifically, the acute-angular structure 36 can be a substantially triangular column structure.

In an exemplary embodiment, a first abutting surface 361 of the acute-angular structure 36 facing the contact surface 2421 is flush with an inner side surface 321 of the elastic arm section 32 facing the bottom plate structure 21. An included angle θ between the first abutting surface 361 of the acute-angular structure 36 and the horizontal plane is equal to or less than 90°, an included angle θ between a second abutting surface 362 and the first abutting surface 361 of the acute-angular structure 36 can be between 45° and 65°, and the second abutting surface 362 is adjacent to the first abutting surface 361. In this way, when a wire core W1 is inserted in the insertion interval S1, the tip of the acute-angular structure 36 can be inserted in the wire core W1 more easily.

Figure 6:
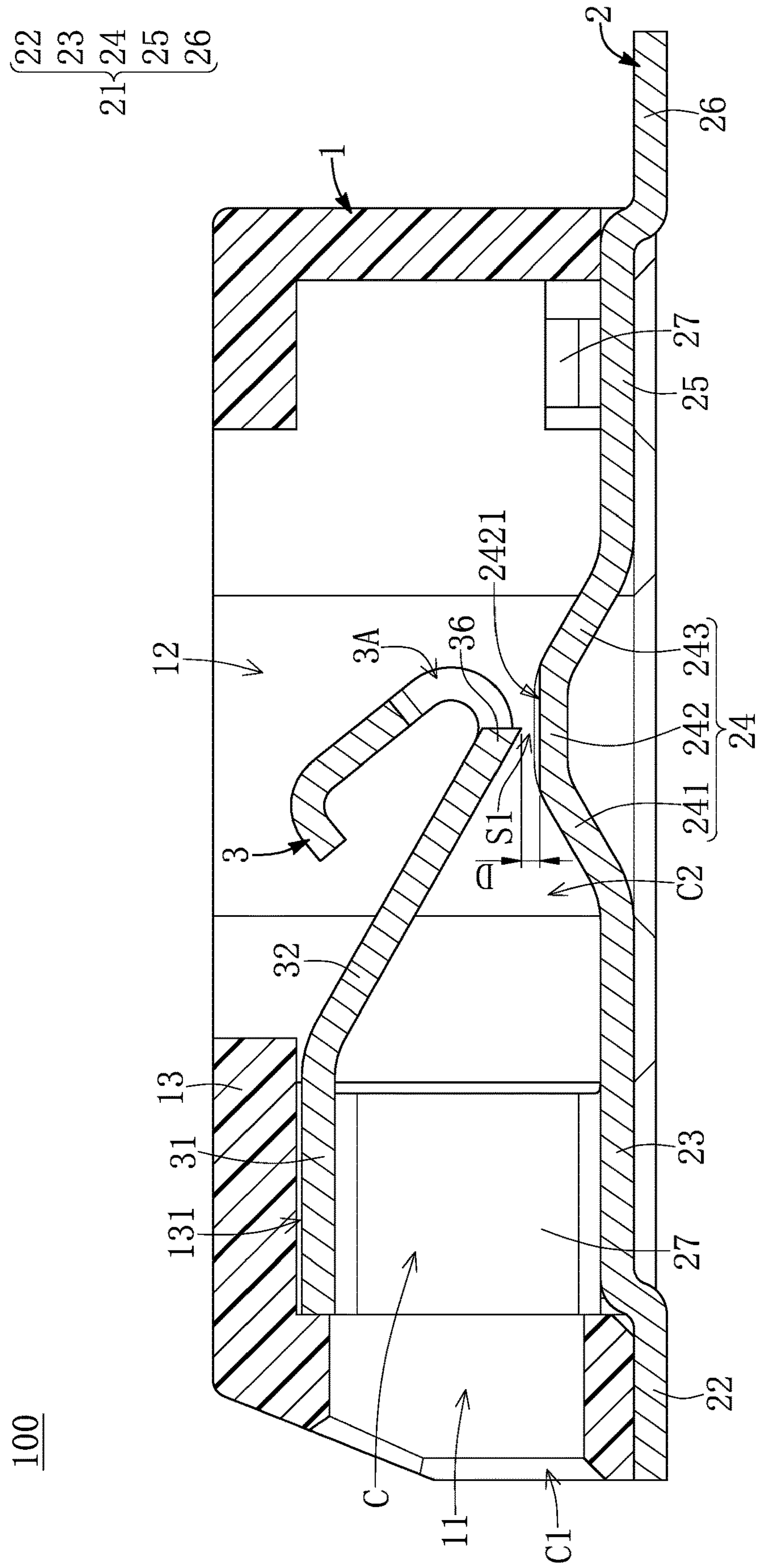
FIG. 6 and FIG. 7 are schematic cross-sectional views respectively showing a wire-clamping connector when being inserted with the wire and not being inserted with the wire according to the first embodiment of the present disclosure.

As shown in FIG. 6, the elastic sheet body 3 and the bottom plate structure 21 jointly form a tapering tunnel C. Two terminals of the tapering tunnel C are respectively defined as an inlet end C1 and a holding end C2. The inlet end C1 is arranged adjacent to the through hole 11, the holding end C2 is arranged adjacent to the insertion interval S1, and an inner diameter of the tapering tunnel C gradually decreases in a direction from the inlet end C1 toward the holding end C2. In a preferred application, a distance D of the insertion interval S1 can be equal to or less than one-tenth of an outer diameter of the wire core W1. For example, when the wire-clamping connector 100 is used to clamp a wire W including the wire core W1 that has an outer diameter from 0.50 mm to 1.10 mm, the distance D of the insertion interval S1 can correspondingly be from 0 mm to 0.15 mm.

Figure 7:
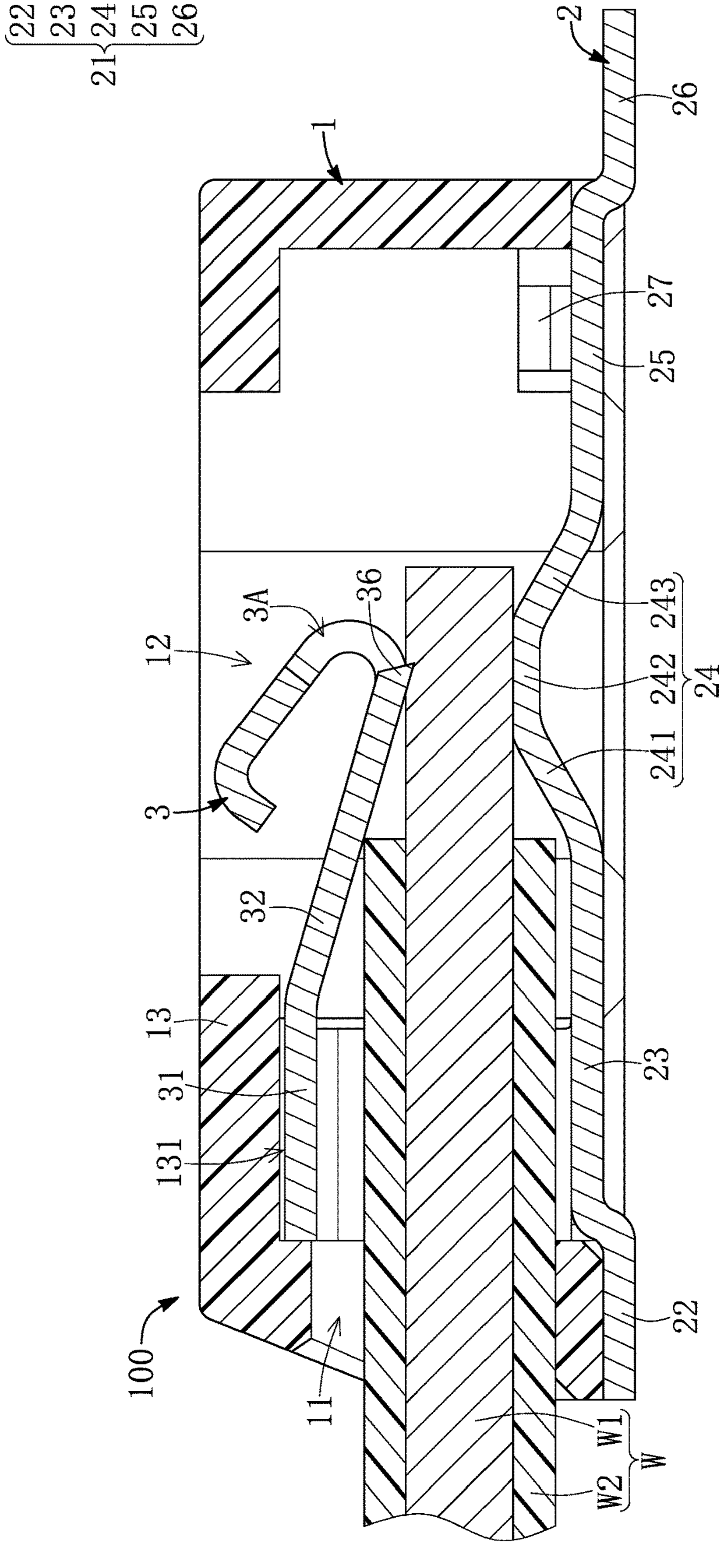

As shown in FIG. 7, when the wire W is inserted in the wire-clamping connector 100, a portion of the wire W is located in the tapering tunnel C, and the wire core W1 of the wire W is jointly held by the elastic sheet body 3 and the bottom plate structure 21 by entering the insertion interval S1. A terminal (i.e., the tip) of the acute-angular structure 36 can be inserted in the wire core W1. Since the distance D of the insertion interval S1 is smaller than the outer diameter of the wire core W1, and the bottom plate structure 21 is fixed to the housing 1, the elastic arm section 32 is pushed by the wire core W1 to undergo an elastic deformation in the direction away from the bottom plate structure 21. In this way, an elastic restoring force generated by the pushed elastic arm section 32 allows the acute-angular structure 36 and the bottom plate structure 21 to jointly hold the wire core W1 in a more stable manner.

Furthermore, in the acute-angular structure 36 inserted in the wire core W1, the first abutting surface 361 and the second abutting surface 362 are connected to the wire core W1 in a surface contact manner, and the contact surface 2421 of the bottom plate structure 21 is also connected to the wire core W1 in the surface contact manner. Therefore, the wire core W1 and the contact element 2 have a relatively better electrical connection. In addition, when the wire core W1 is jointly held by the elastic sheet body 3 and the bottom plate structure 21, the tip of the acute-angular structure 36 is correspondingly inserted in the wire core W1, so that the wire W is not easily affected by external force and detached from the wire-clamping connector 100.

In an exemplary embodiment, the contact surface 2421 can be an arched surface, and a height of a middle position of the arched surface is lower relative to that of the remaining position of the arched surface. In this way, the wire core W1 that enters the insertion interval S1 is correspondingly positioned at a middle position of the contact surface 2421.

It is worth mentioning that, as shown in FIG. 7, through the rising section 241, an insulating layer W2 of the wire W is blocked and cannot enter the insertion interval S1. In this way, when the wire W is inserted in the wire-clamping connector 100, the insulating layer W2 coated on the wire core W1 does not enter the insertion interval S1, thereby ensuring that the wire core W1 has an effective electrical connection with the elastic sheet body 3 and the bottom plate structure 21.

Figure 8:
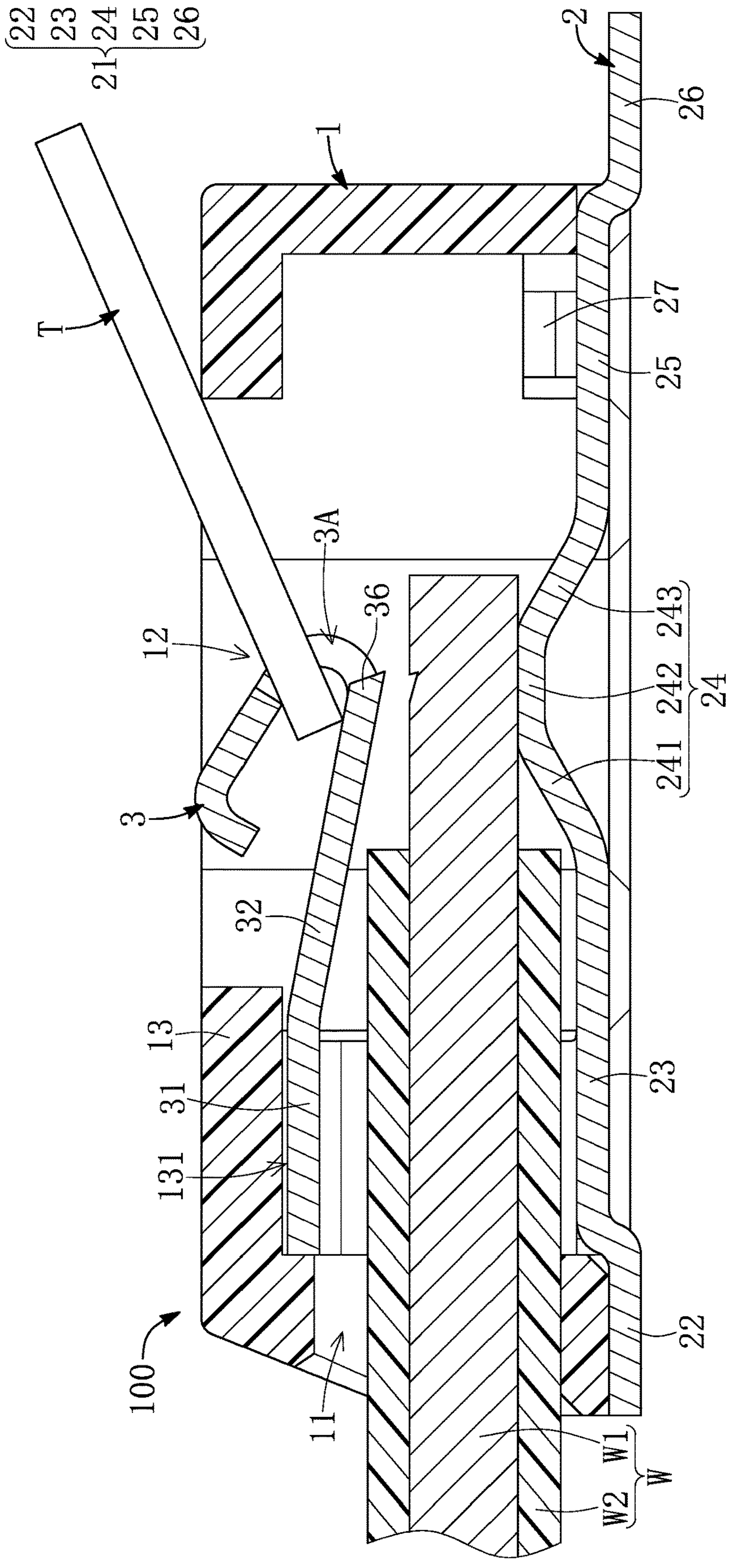
FIG. 8 is a schematic cross-sectional view showing a tool being inserted in an opening of the contact element according to the first embodiment of the present disclosure.
Figure 9:
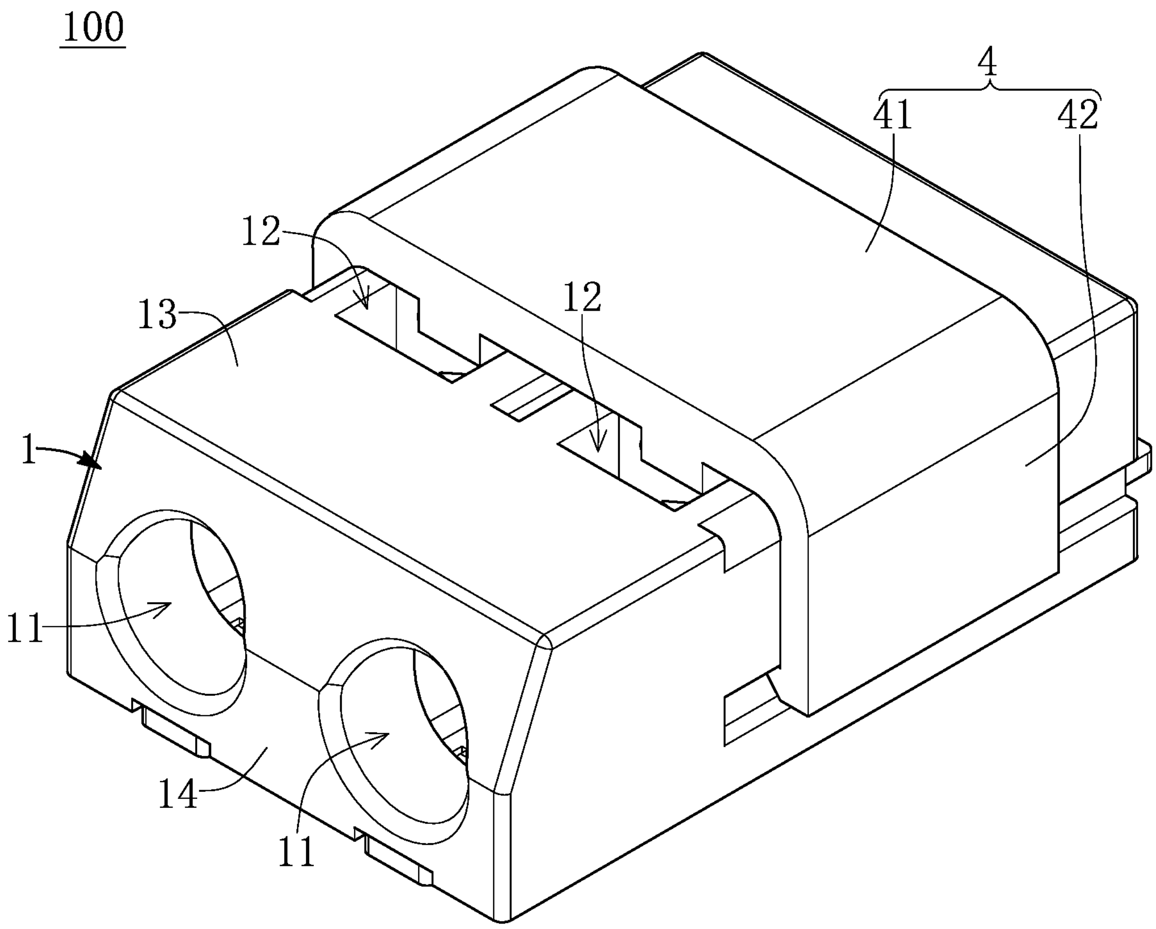
FIG. 9 is a schematic view of a second embodiment of the present disclosure.

As shown in FIG. 8, the opening 3A of the elastic sheet body 3 is configured for insertion of a tool T, and the tool T that is inserted into the opening 3A can be operated by the user to move the elastic arm section 32 and the bent section 33 away from the bottom plate structure 21, such that the elastic sheet body 3 and the bottom plate structure 21 no longer jointly hold the wire core W1. Accordingly, the wire core W1 can be taken out from the wire-clamping connector 100.

Figure 12:
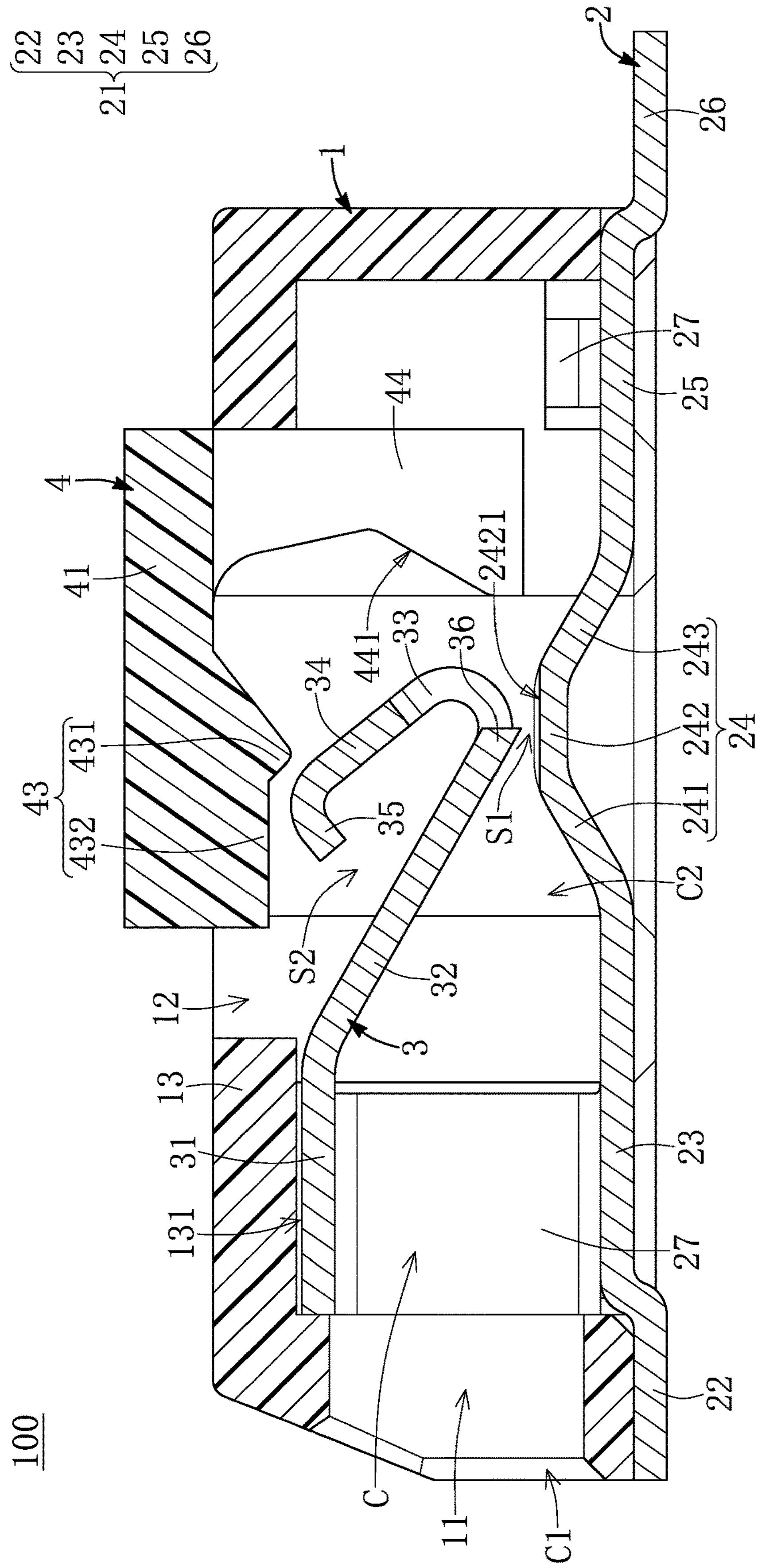
FIG. 12 and FIG. 13 are schematic cross-sectional views respectively showing a sliding member being at a first position when being inserted with the wire and not being inserted with the wire according to the second embodiment of the present disclosure.
Figure 13:
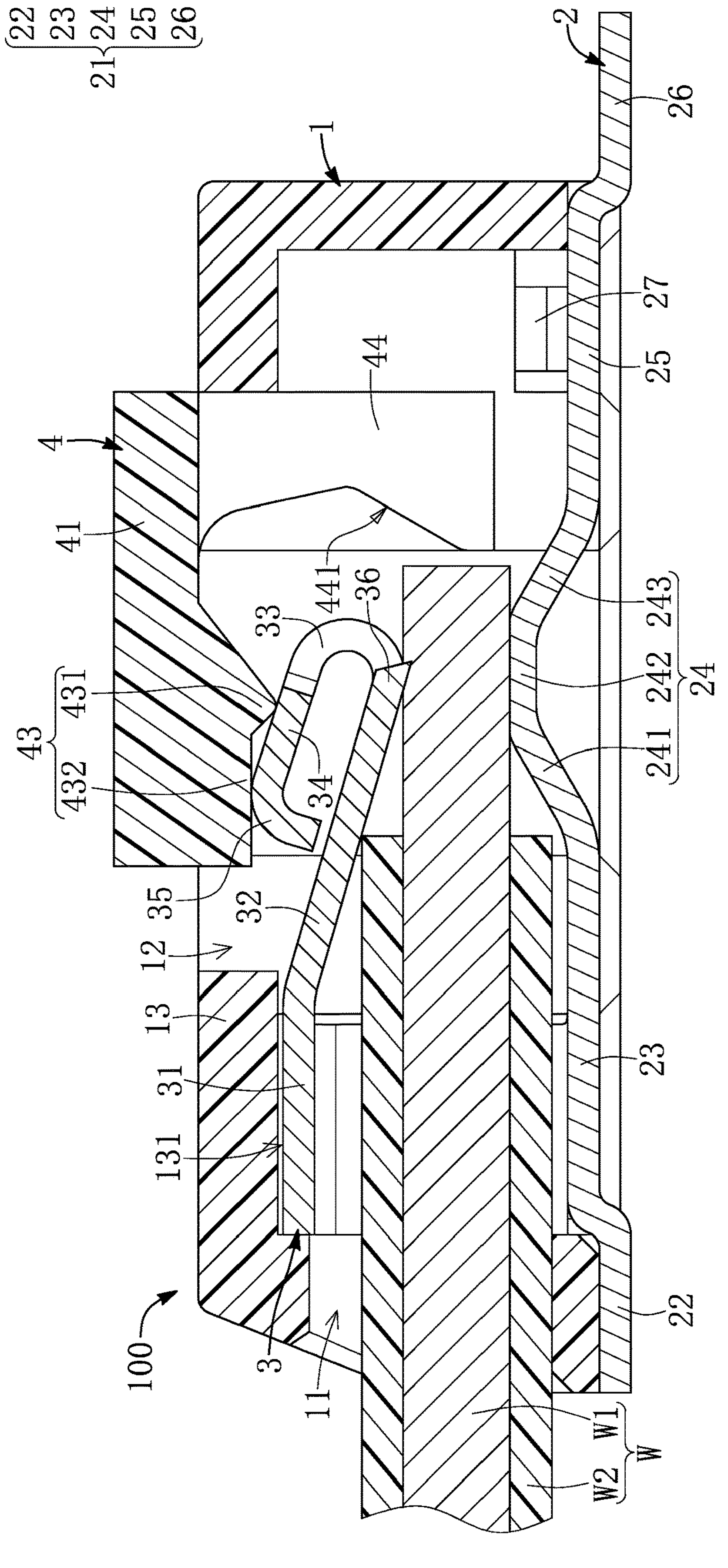
Figure 14:
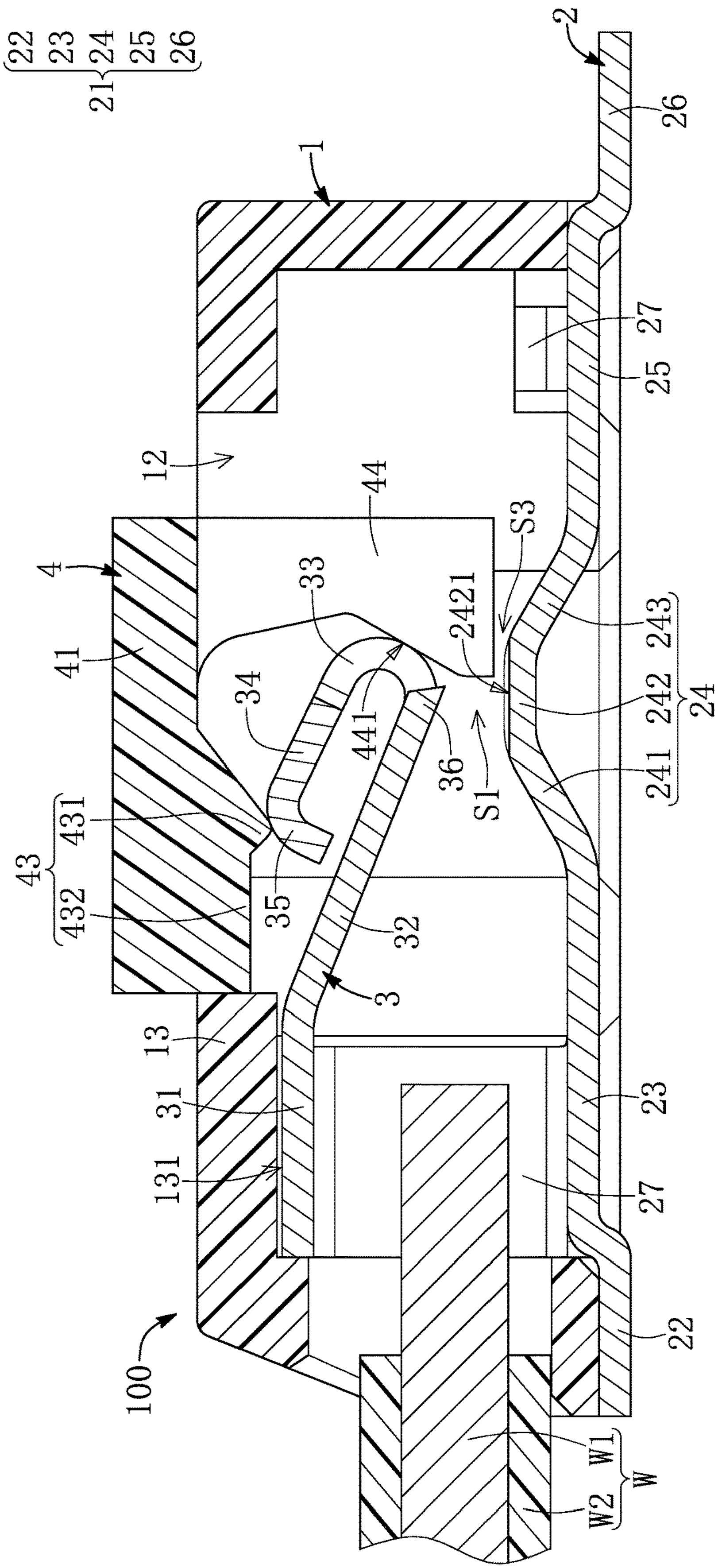
FIG. 14 and FIG. 15 are schematic cross-sectional views respectively showing the sliding member being at a second position when being inserted with the wire and not being inserted with the wire according to the second embodiment of the present disclosure.

References are made to FIG. 9 to FIG. 15, which are schematic views of the wire-clamping connector according to a second embodiment of the present disclosure. The biggest difference between this embodiment and the previous embodiment is that the wire-clamping connector 100 further includes a sliding member 4 slidably connected to the housing 1, and the sliding member 4 can be operated to move between a first position (as shown in FIG. 12) and a second position (as shown in FIG. 14). The housing 1 and the contacting member 2 included in the wire-clamping connector 100 of this embodiment are the same as those of the previous embodiment, and will not be reiterated herein. In the following description, only parts of the housing 1 and the contacting member 2 that are related to the sliding member 4 will be illustrated.

The sliding member 4 can have a top wall 41, two side walls 42, two first abutting portions 43, four second abutting portions 44 and a limiting portion 45. Two opposite sides of the top wall 41 respectively extend in a same direction to form the two side walls 42. When the sliding member 4 is located at the first position or the second position, the top wall 41 can correspondingly shield at least a part of each of the two accommodating slots 12. The two first abutting portions 43 are arranged on an inner side of the top wall 41 and are respectively located in the two accommodating slots 12, and the four second abutting portions 44 are also arranged on the inner side of the top wall 41. Two of the second abutting portions 44 are located in one of the two accommodating slots 12, and another two of the second abutting portions 44 are located in another one of the two accommodating slots 12. The first abutting portions 43 are each located at one end of the sliding member 4 that is close to the through holes 11, and the second abutting portions 44 are each located at another end of the sliding member 4 that is away from the through holes 11.

As shown in FIG. 12, when the sliding member 4 is in the first position and the elastic sheet body 3 and the bottom plate structure 21 do not hold the wire core W1, a gap S2 is formed between the first abutting portion 43 and the elastic sheet body 3. As shown in FIG. 12 and FIG. 13, when the sliding member 4 is in the first position, the wire core W1 is inserted in the insertion interval S1, and the elastic sheet body 3 and the bottom plate structure 21 jointly hold the wire core W1. At this time, the elastic arm section 32 and the acute-angular structure 36 are pushed by the wire core W1 and are elastically deformed in a direction toward the top wall 41 of the sliding member 4. Furthermore, the connection section 34 also moves with the elastic arm section 32 in the direction toward the top wall 41 of the sliding member 4, and the first abutting portion 43 presses an outer side of the connection section 34. In practical applications, the first abutting portion 43 can press the connection section 34 and the auxiliary bent section 35 simultaneously.

When the outer side of the connection section 34 is pressed by the first abutting portion 43, the bent section 33 is elastically deformed. The elastic restoring force generated by the elastic deformation of the bent section 33 allows the connection section 34 and the acute-angular structure 36 to more tightly abut against the first abutment portion 43 and the wire core W1, respectively.

In other words, when the wire core W1 is jointly held by the elastic sheet body 3 and the bottom plate structure 21, the first abutting portion 43 abuts against the connection section 34, such that the elastic arm section 32 and the connection section 34 are elastically deformed. The elastic restoring force generated by the elastic deformation of the elastic arm section 32 and the connection section 34 allows the acute-angular structure 36 and the contact surface 2421 of the platform section 242 to more tightly hold the wire core W1. That is, through the first abutting portion 43 of the sliding member 4, the bent section 33 and the connection section 34, the elastic sheet body 3 and the bottom plate structure 21 can clamp the wire core W1 with a relatively large clamping force, such that the wire W is even less likely to be detached from the wire-clamping connector 100 due to external force.

Figure 10:
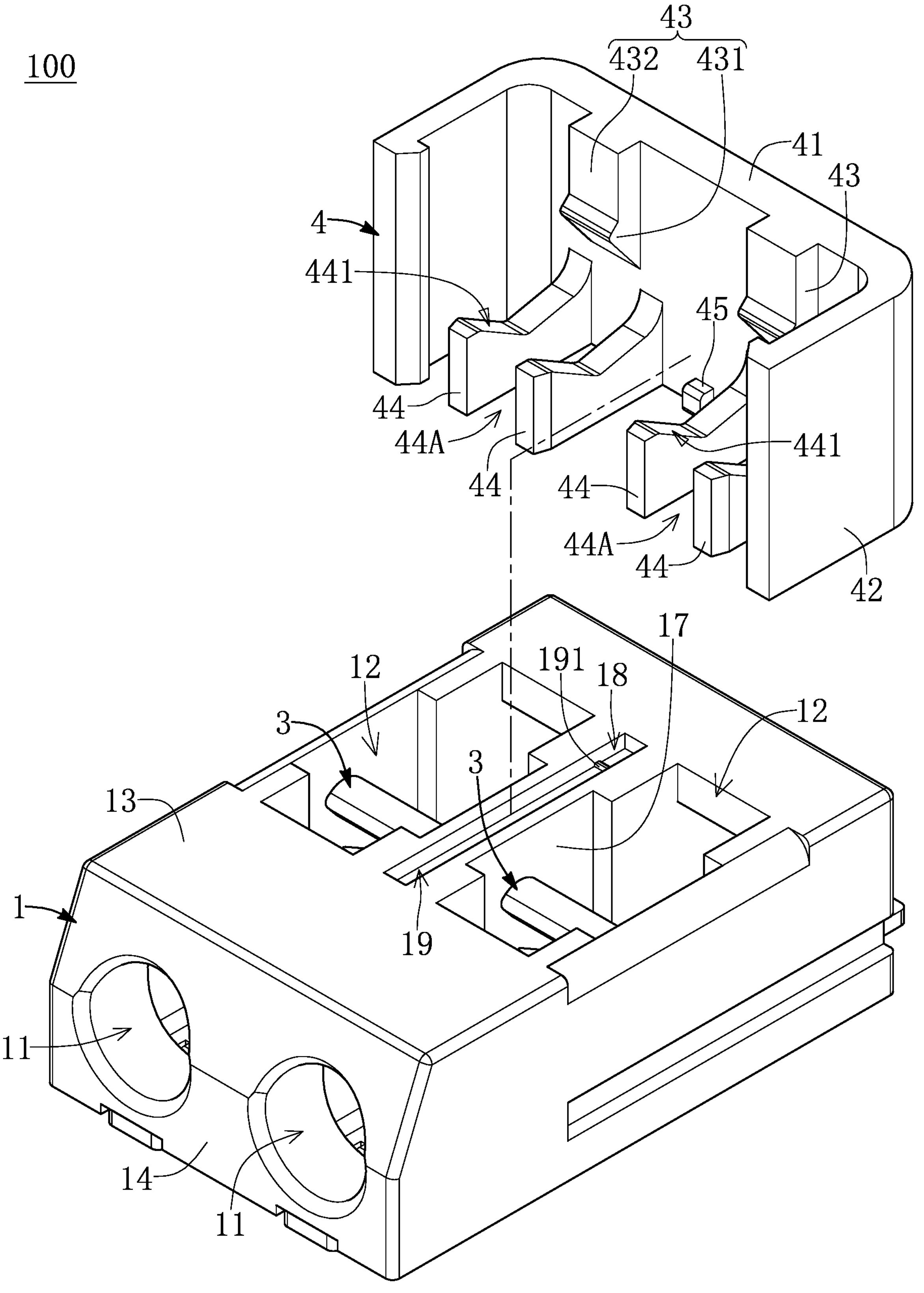
FIG. 10 is a partially exploded view of the second embodiment of the present disclosure.
Figure 11:
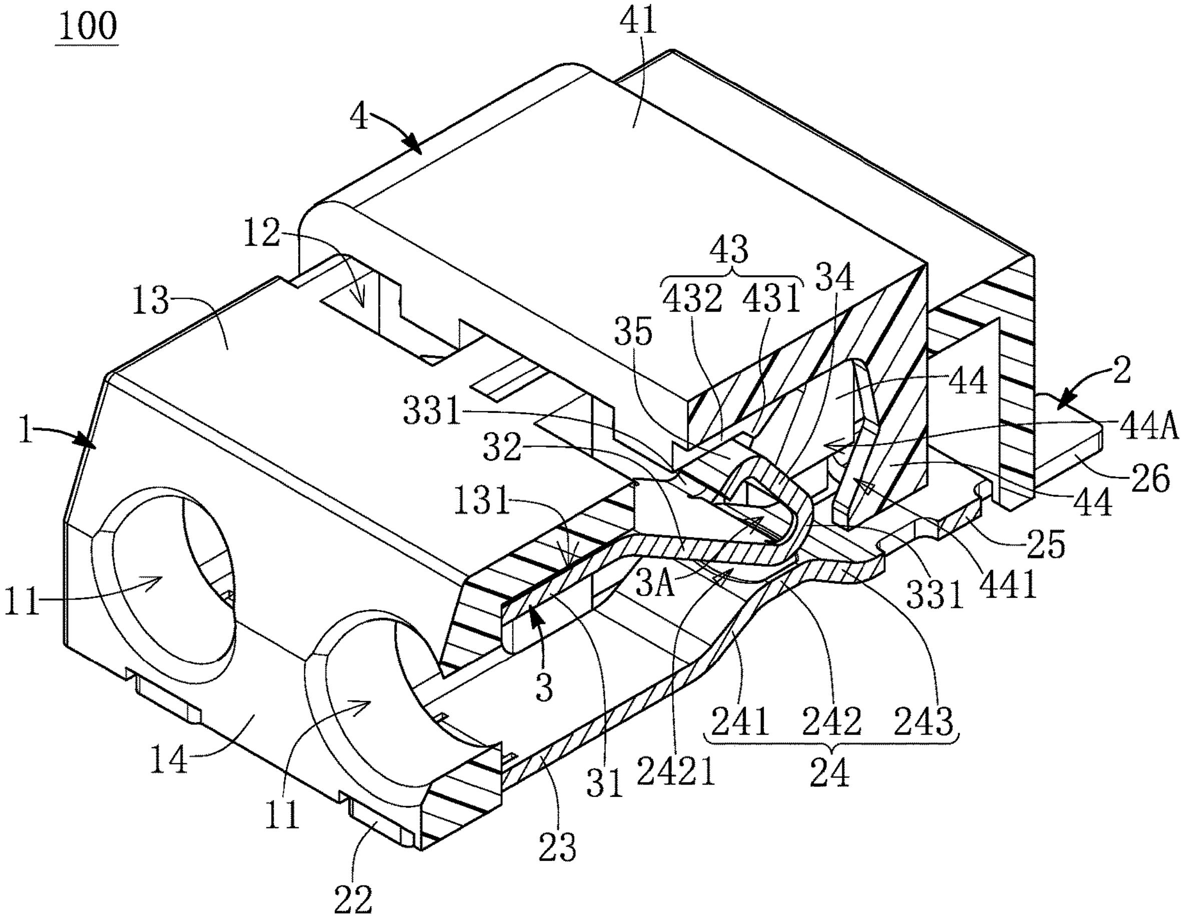
FIG. 11 is a cross-sectional perspective view of the second embodiment of the present disclosure.

As shown in FIG. 10 and FIG. 13, when the sliding member 4 is in the first position, the limiting portion 45 of the sliding member 4 is correspondingly engaged and arranged in a limiting structure 18 of the housing 1, and the sliding member 4 is less likely to be moved relative to the housing 1. Specifically, the top wall 13 of the housing 1 can have a groove 19, and a protruding bump 191 can be arranged in the groove 19. The protruding bump 191 is disposed at a position in the groove 19 that is away from the through holes 11, and a limiting slot (i.e., the limiting structure 18) is formed between the protruding bump 191 and one end wall of the groove 19. When the sliding member 4 is in the first position, the limit portion 45 is correspondingly located in the limiting slot (i.e., the limiting structure 18), such that the sliding member 4 does not easily slide relative to the housing 1 due to external force.

In practical applications, when the sliding member 4 is in the first position, a shortest vertical distance between the limiting portion 45 and a bottom of the groove 19 can be less than a vertical height of the protruding bump 191. In this way, when the user moves the sliding member 4 from the first position to the second position (or when the user moves the sliding member 4 from the second position to the first position), the limiting portion 45 moves across the protruding bump 191, and the user can clearly feel the limiting portion 45 and the protruding bump 191 abutting against each other. Therefore, the user can clearly know that the sliding member 4 has left the first position or that the sliding member 4 has reached the first position.

Figure 4:
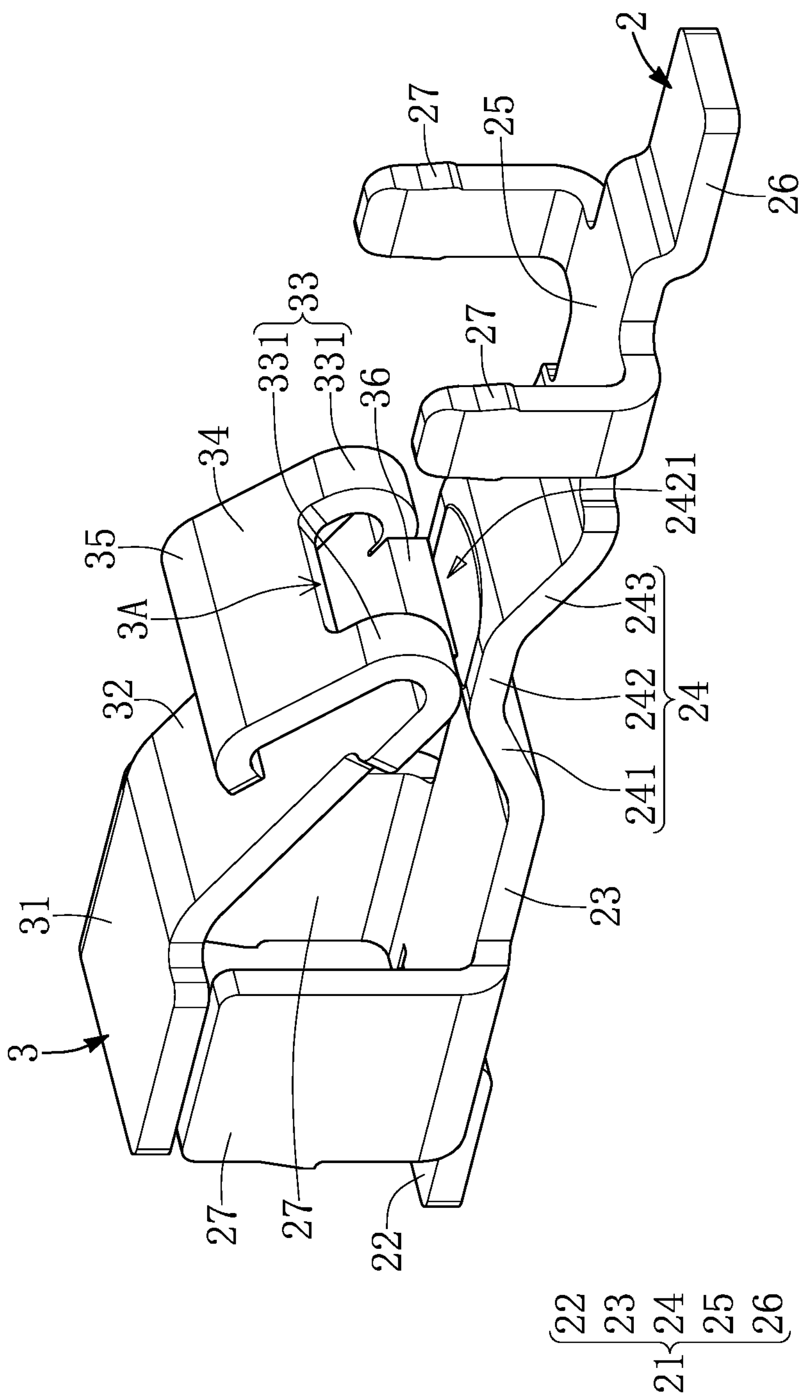
FIG. 4 is a schematic view of a contact element according to the first embodiment of the present disclosure.
Figure 5:
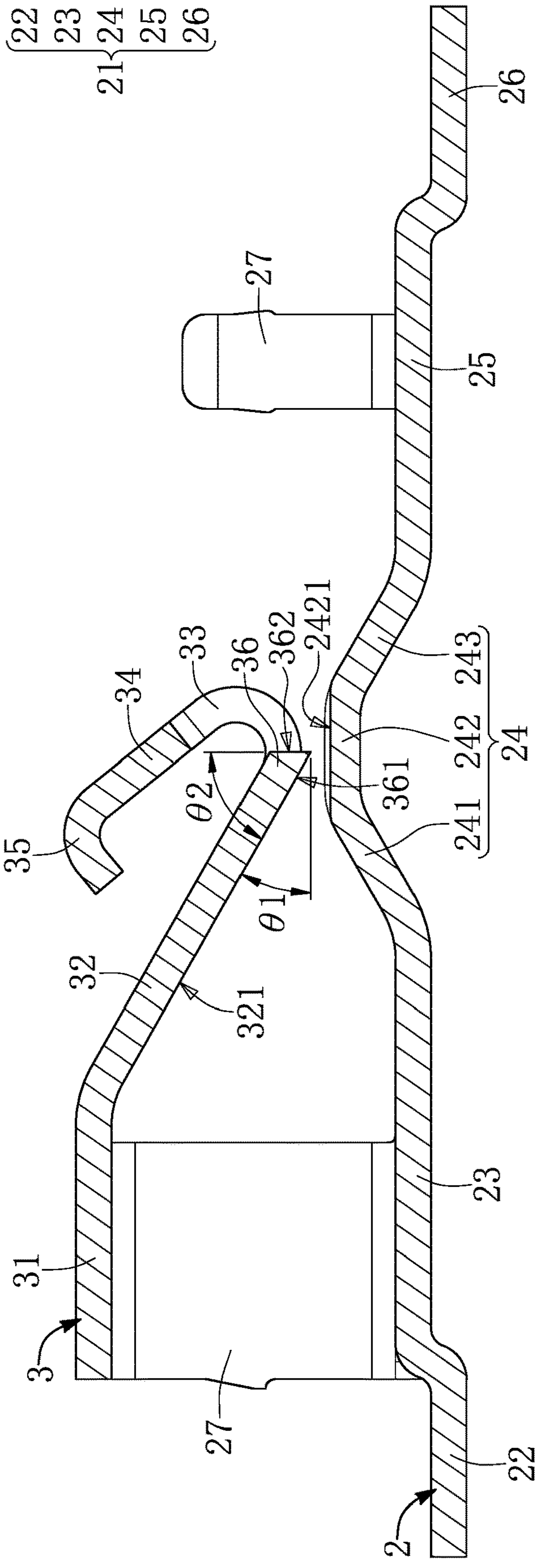
FIG. 5 is a side view of the contact element according to the first embodiment of the present disclosure.

As shown in FIG. 4 and FIG. 10, the opening 3A of the elastic sheet body 3 can correspondingly divide the bent section 33 into two abutting sections 331. An avoidance interval 44A is formed between the two of the second abutting portions 44 of the sliding member 4, the avoidance interval 44A is configured to correspond to the opening 3A, and the two of the second abutting portions 44 are respectively disposed facing the two abutting sections 331. The avoidance interval 44A can be used to accommodate a part of the wire core W1 held by the elastic sheet body 3 and the bottom plate structure 21.

As shown in FIG. 12 and FIG. 14, when the elastic sheet body 3 and the bottom plate structure 21 do not hold the wire core W1 in place, and the sliding member 4 moves from the first position to the second position, the two of the second abutting portions 44 correspondingly push the two abutting sections 331. Furthermore, each of the two abutting sections 331 moves in the direction away from the bottom plate structure 21 along a guiding inclined surface 441 of an adjacent one of the second abutting portions 44, thereby widening the insertion interval S1. Accordingly, the wire core W1 having a relatively large outer diameter can enter the insertion interval S1 more easily.

In other words, when the user wants to insert the wire core W1 having a relatively large outer diameter in the wire-clamping connector 100, the user can first move the sliding member 4 to the second position to slightly widen the insertion interval S1 by the second abutting portion 44. Therefore, the user can easily insert the wire core W1 having a relatively large outer diameter in the insertion interval S1.

It is worth mentioning that, when the sliding member 4 is in the second position, each of the second abutting portions 44 does not contact the platform section 242, and an interval S3 is defined between each of the second abutting portions 44 and the platform section 242. That is, when the sliding member 4 is moved between the first position and the second position, the second abutting portions 44 do not contact the platform section 242.

As shown in FIG. 10 and FIG. 13, each of the first abutting portions 43 has a convex portion 431 and a flat portion 432. A height of the convex portion 431 relative to the top wall 41 of the sliding member 4 is greater than that of the flat portion 432 relative to the top wall 41 of the sliding member 4. When the sliding member 4 is in the second position, the convex portion 431 of the first abutting portion 43 abuts against the auxiliary bent section 35, the second abutting portion 44 abuts against the bent section 33, and the bent section 33, the connection section 34 and the auxiliary bent section 35 are held by the first abutting portion 43 and the second abutting portion 44.

Figure 15:
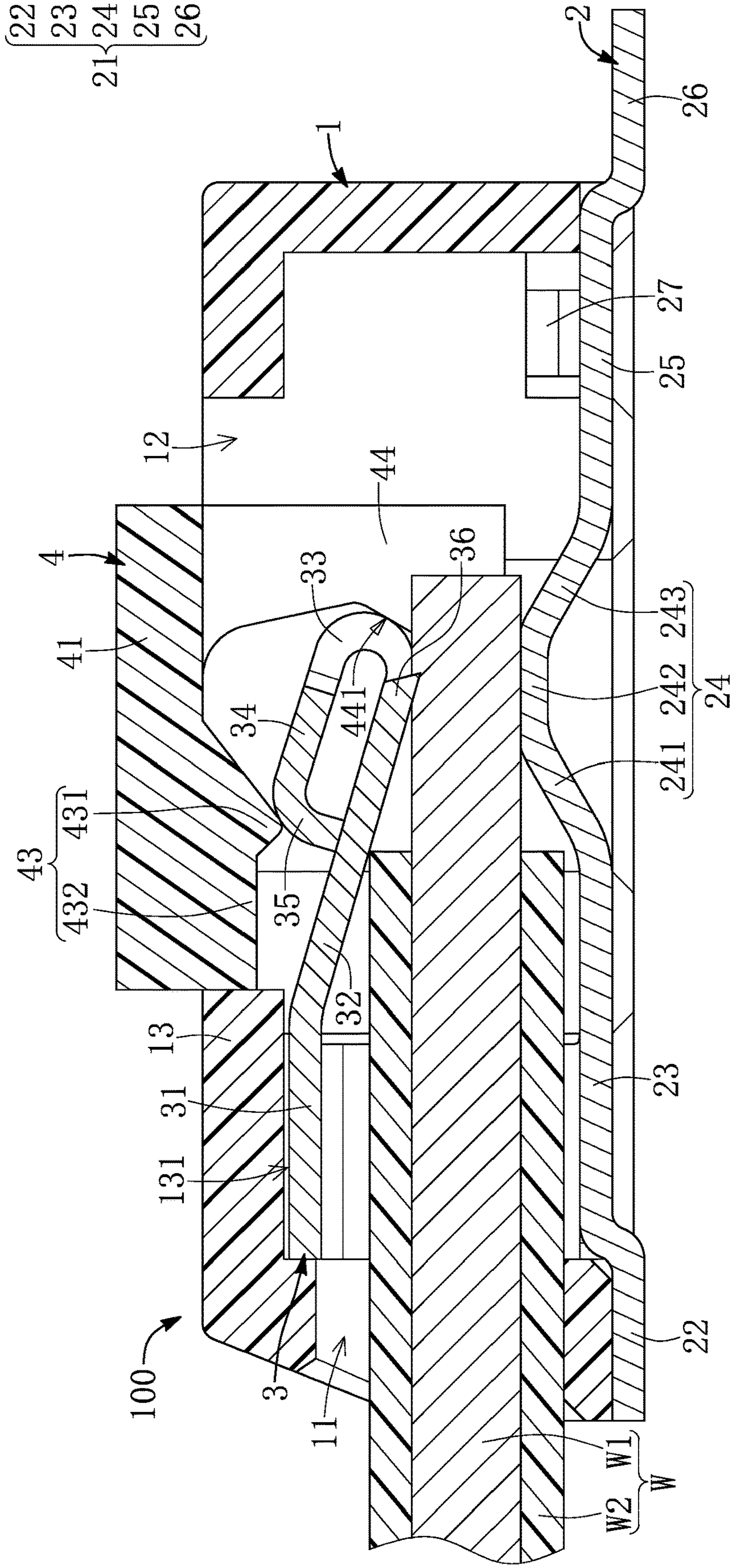

As shown in FIG. 13 to FIG. 15, when the sliding member 4 is in the second position and the wire core W1 is inserted in the insertion interval S1, the elastic arm section 32 moves in the direction away from the bottom plate structure 21, and the bent section 33 moves along the guiding inclined surface 441 of the second abutting portion 44. The first abutting portion 431 abuts against the auxiliary bent section 35, thereby causing the connection section 34 to be elastically deformed in a direction toward the elastic arm section 32. The user can then move the sliding member 4 from the second position to the first position, so that the convex portion 431 of the first abutting portion 43 presses the outer side of the connection section 34. In this way, the acute-angular structure 36 and the bottom plate structure 21 can better hold the wire core W1. In other words, the user can insert a wire having a large outer diameter in the wire-clamping connector 100 by the following steps: firstly, move the sliding member 4 to the second position; then, insert the wire in the wire-clamping connector 100; and finally, move the sliding member 4 to the first position.

Therefore, in the wire-clamping connector 100 of this embodiment, through the sliding member 4 and the first abutting portion 43, the second abutting portion 44, and the limiting portion 45 of the sliding member 4, the elastic sheet body 3 and the bottom plate structure 21 can better hold the wire core W1, and the user can more easily insert the wire core W1 having a relatively large outer diameter in the insertion interval S1.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A wire-clamping connector, comprising:

a housing including at least one through hole and at least one accommodating slot, wherein the accommodating slot penetrates a top wall of the housing, the through hole penetrates a side wall of the housing, and the through hole and the accommodating slot are communicated with each other; and at least one contact element disposed in the housing, wherein the contact element includes:

a bottom plate structure disposed opposite to the top wall, wherein the bottom plate structure includes a protruding portion that has a contact surface; and an elastic sheet body, wherein a terminal portion of the elastic sheet body is fixed to the top wall, and a portion of the elastic sheet body is formed by the terminal portion of the elastic sheet body extending in a direction toward the protruding portion, and wherein the elastic sheet body has an acute-angular structure, the acute-angular structure is configured to be adjacent to the contact surface, and an insertion interval is defined between the acute-angular structure and the contact surface;

wherein the through hole is configured for insertion of a wire, a wire core of the wire inserted in the through hole enters the insertion interval and is clamped together by the acute-angular structure and the contact surface, and an elastic restoring force generated by the pressed elastic sheet body allows the wire core to adjoin the contact surface;

wherein the elastic sheet body has a fixed section, an elastic arm section and a bent section; wherein the fixed section is fixed to the top wall, one end of the elastic arm section is connected to the fixed section, and the bent section is formed by another end of the elastic arm section bending in a direction away from the bottom plate structure; wherein the elastic arm section is formed by one end of the fixed section extending in a direction toward the bottom plate structure, an opening is formed between the bent section and the elastic arm section, and the opening is configured for insertion of a tool; wherein the tool that is inserted into the opening is operated to move the elastic arm section and the bent section away from the bottom plate structure; wherein the acute-angular structure is formed on a terminal of the elastic arm section, and the acute-angular structure is configured to be adjacent to the opening.

2. The wire-clamping connector according to claim 1, wherein the contact surface is an arched surface, and the arched surface is used to position the wire core inserted into the insertion interval at a middle position of the contact surface.

3. The wire-clamping connector according to claim 1, wherein the elastic sheet body and the bottom plate structure jointly form a tapering tunnel, two terminals of the tapering tunnel are respectively defined as an inlet end and a holding end, the inlet end is arranged to be adjacent to the through hole, the holding end is arranged to be adjacent to the insertion interval, and an inner diameter of the tapering tunnel gradually decreases in a direction from the inlet end toward the holding end; wherein a first abutting surface of the acute-angular structure that faces the contact surface is flush with an inner side surface of the elastic arm that faces the bottom plate structure, and an included angle between the first abutting surface of the acute-angular structure and a horizontal plane is equal to or less than 90°.

4. The wire-clamping connector according to claim 3, wherein the acute-angular structure further includes a second abutting surface, the second abutting surface is adjacent to the first abutting surface, and an included angle between the second abutting surface and the first abutting surface is between 45° and 65°.

5. The wire-clamping connector according to claim 1, further comprising a sliding member, wherein the sliding member is slidably connected to the housing, and is operated to move between a first position and a second position; wherein the sliding member has a first abutting portion correspondingly located in the accommodating slot; wherein, when the sliding member is at the first position, and the elastic sheet body and the bottom plate structure do not jointly hold the wire core, a gap is defined between the first abutting portion and the elastic sheet body; wherein, when the sliding member is at the first position, and the elastic sheet body and the bottom plate structure jointly hold the wire core, the first abutting portion pushes the elastic sheet body such that the elastic sheet body presses against the contact surface.

6. The wire-clamping connector according to claim 5, wherein the elastic sheet body has a fixed section, an elastic arm section, a bent section, a connection section and an auxiliary bent section; wherein the fixed section is fixed to the top wall, one end of the elastic arm section is connected to the fixed section, and the bent section is formed by another end of the elastic arm section bending in a direction away from the bottom plate structure; wherein the elastic arm section is formed by one end of the fixed section extending in a direction toward the bottom plate structure, and an opening is formed between the bent section and the elastic arm section; wherein the acute-angular structure is formed on a terminal of the elastic arm section, and the acute-angular structure is configured to be adjacent to the opening; wherein one end of the bent section away from the elastic arm section is connected to one end of the connection section, another end of the connection section is connected to the auxiliary bent section, the connection section is arranged facing the elastic arm section, and the auxiliary bent section is formed by the another end of the connection section bending in a direction toward the elastic arm section; wherein, when the sliding member is positioned in the first position of the housing, the first abutting portion abuts against at least one of the connection section and the auxiliary bent section, the bent section is pressed to generate the elastic restoring force, and the elastic restoring force generated by the pressed bent section allows the wire core to adjoin the contact surface.

7. The wire-clamping connector according to claim 5, wherein the sliding member has a second abutting portion; wherein, when the sliding member is at the second position, the second abutting portion is located between the acute-angular structure and the contact surface, and the second abutting portion abuts against the elastic sheet body and widens the insertion interval.

8. The wire-clamping connector according to claim 7, wherein the elastic sheet body has a fixed section, an elastic arm section, a bent section, a connection section and an auxiliary bent section; wherein the fixed section is fixed to the top wall, one end of the elastic arm section is connected to the fixed section, and the bent section is formed by another end of the elastic arm section bending in a direction away from the bottom plate structure; wherein the elastic arm section is formed by one end of the fixed section extending in a direction toward the bottom plate structure, and an opening is formed between the bent section and the elastic arm section; wherein the acute-angular structure is formed on a terminal of the elastic arm section, and the acute-angular structure is configured to be adjacent to the opening; wherein one end of the bent section away from the elastic arm section is connected to one end of the connection section, another end of the connection section is connected to the auxiliary bent section, the connection section is arranged facing the elastic arm section, and the auxiliary bent section is formed by the another end of the connection section bending in a direction toward the elastic arm section; wherein, when the sliding member is moved from the first position to the second position, the second abutting portion abuts against the bent section such that the elastic sheet body moves away from the bottom plate structure and widens the insertion interval, and the sliding member is not in contact with the bottom plate structure; wherein, when the sliding member is at the second position, the first abutting portion and the second abutting portion jointly hold the bent section, the connection section and the auxiliary bent section.

9. The wire-clamping connector according to claim 8, wherein the opening divides the bent section into two abutting sections, the sliding member has two of the second abutting portions, and an avoidance interval is formed between the two of the second abutting portion; wherein the avoidance interval is configured to correspond to the opening, the two of the second abutting portions are respectively disposed facing the two abutting sections, and a part of the wire core held by the elastic sheet body and the bottom plate structure is accommodated in the avoidance interval; wherein, when the sliding member is moved from the first position to the second position, the two of the second abutting portions correspondingly push the two abutting sections, and each of the two abutting sections moves away from the bottom plate structure along a guiding inclined surface of an adjacent one of the two of the second abutting portions.

* * * * *